(12) United States Patent
Van Der Gucht et al.

(10) Patent No.: US 11,298,936 B2
(45) Date of Patent: Apr. 12, 2022

(54) DIGITAL PRINTING APPARATUS AND METHOD

(71) Applicant: XEIKON MANUFACTURING N.V., Lier (BE)

(72) Inventors: Romain Jan Victor Paul Van Der Gucht, Lint (BE); Jurgen Norbert Bart Devlieghere, Borgerhout (BE)

(73) Assignee: XEIKON MANUFACTURING N.V., Lier (BE)

( * ) Notice: Subject to any disclaimer, the term of this patent is extended or adjusted under 35 U.S.C. 154(b) by 0 days.

(21) Appl. No.: 16/769,055

(22) PCT Filed: Dec. 12, 2018

(86) PCT No.: PCT/EP2018/084535
§ 371 (c)(1),
(2) Date: Jun. 2, 2020

(87) PCT Pub. No.: WO2019/115608
PCT Pub. Date: Jun. 20, 2019

(65) Prior Publication Data
US 2021/0316548 A1 Oct. 14, 2021

(30) Foreign Application Priority Data
Dec. 13, 2017 (NL) ...................... 2020081

(51) Int. Cl.
*B41J 2/045* (2006.01)
*B41J 2/155* (2006.01)
*B41J 2/505* (2006.01)

(52) U.S. Cl.
CPC ....... *B41J 2/04505* (2013.01); *B41J 2/04573* (2013.01); *B41J 2/155* (2013.01); *B41J 2/5056* (2013.01)

(58) Field of Classification Search
CPC .... B41J 2/04505; B41J 2/04573; B41J 2/155; B41J 2/5056
See application file for complete search history.

(56) References Cited

U.S. PATENT DOCUMENTS

| | | | |
|---|---|---|---|
| 2003/0098898 A1* | 5/2003 | Vanhooydonck | B41J 2/2103 347/41 |
| 2006/0284912 A1* | 12/2006 | Mataki | B41J 2/04581 347/12 |
| 2009/0244144 A1* | 10/2009 | Mataki | B41J 2/2132 347/14 |

FOREIGN PATENT DOCUMENTS

| | | |
|---|---|---|
| EP | 1308293 A1 | 5/2003 |
| EP | 1361068 A1 | 11/2003 |
| EP | 1361070 A1 | 11/2003 |

OTHER PUBLICATIONS

International Search Report and Written Opinion for the International Patent Application No. PCT/EP2018/084535, dated Feb. 19, 2019, 10 pages.

* cited by examiner

*Primary Examiner* — Jason S Uhlenhake
(74) *Attorney, Agent, or Firm* — Kacvinsky Daisak Bluni PLLC

(57) ABSTRACT

A method for printing with an inkjet head includes: printing with an inkjet head comprising a plurality n of parallel nozzle rows, where n is at least 2; where each nozzle row comprises a plurality of nozzles, where adjacent nozzle rows of the plurality of nozzle rows are shifted with respect to each other; where a distance between two nozzle rows, seen in the printing direction, is d; and where said printing includes: moving the substrate with respect to the inkjet head in the printing direction at a printing speed v'; and firing each nozzle of the plurality of nozzles with a firing frequency f'; where the plurality of nozzle rows are fired at (Continued)

different instants in time, such that the distance d' between printed rows of dots printed by the two nozzle rows, seen in the printing direction, is larger or smaller than d.

20 Claims, 9 Drawing Sheets

$t = t_1'''$
$= t_1 - 3\Delta t$ $t = t_1''$
$= t_1 - 2\Delta t$ $t = t_1'$
$= t_1 - \Delta t$ $t = t_1$ $t = t_1''' + 1/f'$
$= t_1 - 3\Delta t + 1/f'$ $t = t_1'' + 1/f'$
$= t_1 - 2\Delta t + 1/f'$ $t = t_1' + 1/f'$
$= t_1 - \Delta t + 1/f'$ $t = t_1 + 1/f'$ $t = t_1''' + 2 \times 1/f'$
$= t_1 - 3\Delta t + 2 \times 1/f'$ $t = t_1'' + 2 \times 1/f'$
$= t_1 - 2\Delta t + 2 \times 1/f'$ $t = t_1' + 2 \times 1/f'$
$= t_1 - \Delta t + 2 \times 1/f'$ $t = t_1 + 2 \times 1/f'$ $t = t_1 + 4 \times 1/f'$ $t = t_1 + 7 \times 1/f'$

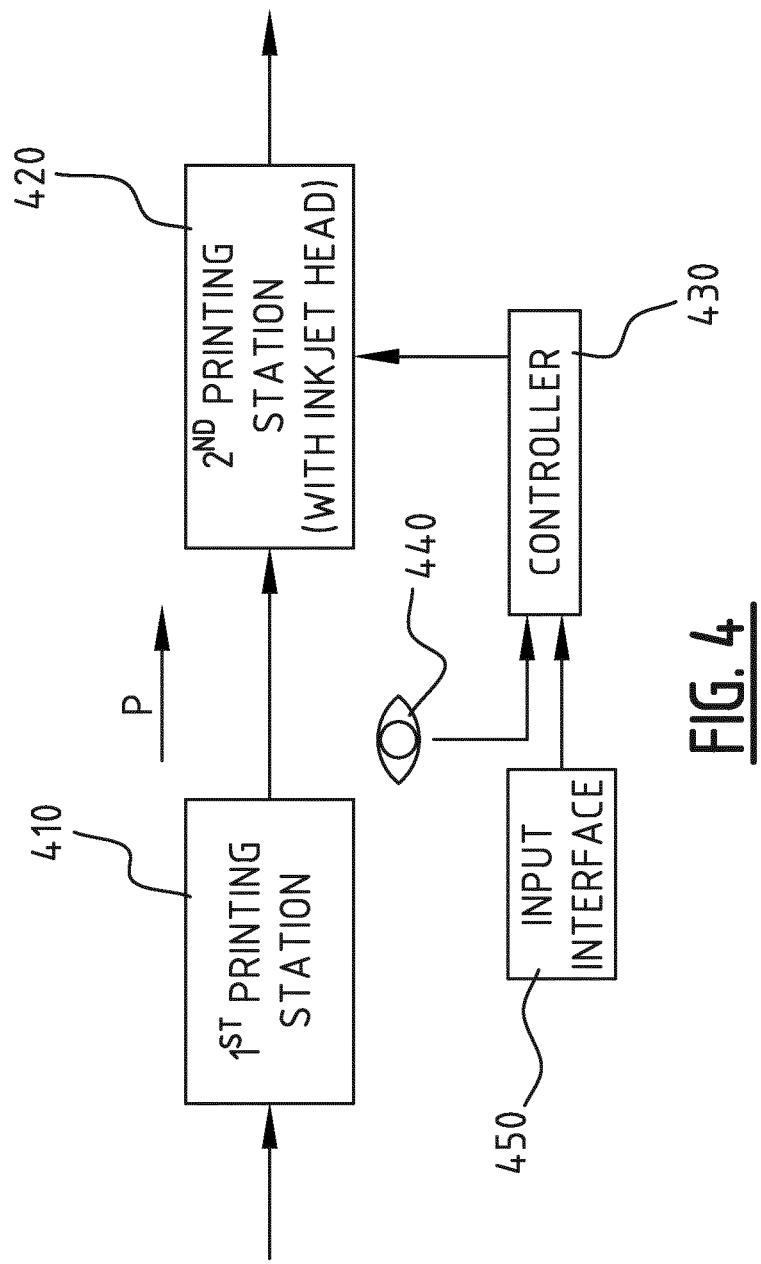

DIGITAL PRINTING APPARATUS AND METHOD

This is a national stage application filed under 35 U.S.C. § 371 of pending international application PCT/EP2018/084535, filed Dec. 12, 2018, which claims priority to Netherlands Patent application NL 2020081, filed Dec. 13, 2017, the entirety of which applications are hereby incorporated by reference herein.

FIELD OF INVENTION

The field of the invention relates to digital printing apparatus and methods using an inkjet head and in particular to a method for modifying a printing resolution in a printing direction when printing with an inkjet head. According to more particular embodiments, the invention relates to fusion printing where a first printing step is combined with a second printing step, typically a second inkjet printing step.

BACKGROUND

An ink-jet printer records an image on a recording medium by discharging an ink from nozzles formed on an inkjet head. A substrate is transported below the inkjet head with a predetermined speed.

The number of nozzles required across the printing direction is primarily defined by the desired print resolution relative to the given print resolution of the inkjet printing head used. Since a nozzle has minimum dimensions the distance between two adjacent nozzles cannot be infinitely decreased. For that reason an inkjet head preferably comprises a plurality of rows of nozzles which are shifted with respect to each other in order to increase the printing resolution.

An example of a known inkjet head comprises a plurality of rows n, e.g. 4 rows (n=4), each having a plurality of nozzles m, e.g. 320 nozzles (m=320), wherein the rows are oriented in a direction perpendicular to the printing direction, i.e. in the direction in which the substrate moves with respect to the inkjet head. Due to physical limitations, typically the rows are separated by more than one scan line, e.g. k scan lines where k may be e.g. 13 scan lines. The nozzles of the inkjet head are fired substantially simultaneously—there may be a small difference (order of nanoseconds) to avoid large power peaks —, and the firing frequency is such that each time the substrate has moved from one row to the next row a firing of all nozzles of the inkjet head is performed k times. The rows are shifted with respect to each other such that the combination of dots printed during subsequent steps of the printing process form a regular pattern. More in particular, when the inkjet head has fired all (n×m) nozzles a number of times while the substrate moves below the inkjet head, one line of the n lines extending perpendicular on the printing direction will be finished, and may comprise (n×m) dots.

Another example of a known inkjet head comprises an array of a plurality of rows (n) and columns (m), e.g. 32 rows (n=32), each having a plurality of nozzles, e.g. 64 nozzles (m=64), wherein the rows are oriented under a small angle with respect to a direction perpendicular to the printing direction, and the columns are oriented under a small angle with respect to the printing direction. Seen in a direction perpendicular to the printing direction, a plurality of such heads may be provided next to each other. During printing all (n×m) nozzles are fired substantially simultaneously with a firing frequency which is such that the nozzles fire at least every time the substrate has moved to the next row. Also using such an inkjet head, the distance between adjacent printed dots, seen in the printing direction, may be a factor smaller than the distance between adjacent nozzle rows. By increasing the number of rows and columns, the resolution in the printing direction may be increased.

A problem with such inkjet heads is that when the timing of the firing and/or the position of the substrate is not exact, printed dots that should be on a single line perpendicular on the printing direction, may be spread over a plurality of inclined short segments. In other words, the firing frequency and the printing speed need to be perfectly matched to the distance between adjacent rows. Further it is not possible to change the resolution of the inkjet head in a dynamic way.

Especially when performing fusion printing, i.e. when combining a first printing step with a second inkjet printing step, this may be a problem. For example, when a first image is printed using a first electrophotographic or inkjet printing process, the substrate with the image may shrink or stretch, resulting in an image with a slightly increased or decreased resolution, especially seen in the printing direction. If a second image is printed on this first image using a second inkjet printing with a fixed resolution, as described above, then the second image will be misaligned with the first image as a consequence of the shrinking of stretching.

SUMMARY

The object of embodiments of the invention is to provide a method for printing with an inkjet head that allows modifying a printing resolution in a printing direction.

According to a first aspect of the invention the method comprises printing with an inkjet head comprising a plurality n of parallel nozzle rows, wherein n is at least 2. Each nozzle row comprises a plurality of nozzles. Adjacent nozzle rows of the plurality of nozzle rows are shifted with respect to each other, such that, projected on a line perpendicular on the printing direction, the plurality of nozzles form a regular pattern. The distance between two nozzle rows, seen in the printing direction, is d. The printing comprises:
  moving the substrate with respect to the inkjet head in the printing direction at a printing speed v';
  firing each nozzle of said plurality of nozzles with a firing frequency f'; wherein said plurality of nozzle rows are fired at different instants in time, such that the distance d' between printed rows of dots printed by said two nozzle rows, seen in the printing direction, is larger or smaller than d;
  wherein each nozzle is fired with a firing frequency f', wherein the firing frequency f' and/or the printing speed v' are chosen such that f'=k*v'/d', wherein k is an integer.

By making the distance d' between printed rows of dots printed by adjacent nozzle rows, seen in the printing direction, larger or smaller than d, the resolution in the printing direction is changed. This is achieved by changing the timing of the firing of the plurality of nozzle rows. Indeed, instead of firing all nozzles of the inkjet head at substantially the same time as in the prior art, the nozzles of different rows are fired at different times, to obtain the distance d'. In the context of the invention the changing of the timing can be variable depending on the desired resolution seen in the printing direction, but when a visible resolution change is required a timing difference is preferably at least 10 microseconds, more preferably at least 50 microseconds. When the term "substantially simultaneous" is used, typically this implies that any difference in firing instant is smaller than 10 microseconds.

In an exemplary embodiment, the method further comprises printing a first image on the substrate at a first printing station upstream of the inkjet head, wherein the substrate has undergone a shrinkage or extension in the printing direction when leaving said first printing station. Next a second image is printed on said first image using the inkjet head, wherein the plurality of nozzle rows are fired at different instants in time, such that d' is smaller than d in case of shrinkage and larger than d in case of extension. In other words, when performing fusion printing, i.e. printing in a first printing station followed by printing in a second printing station comprising the inkjet head, any shrinkage or extension in the printing direction due to the first printing station may be taken into account. Indeed, by changing the resolution appropriately the second image can be well aligned with the first image notwithstanding the shrinkage or extension of the substrate in the first printing station. Such an embodiment is e.g. useful when the first printing station is an electrophotographic printing station using a dry or liquid toner, where shrinking may occur e.g. during a fusing and/or curing step.

In order to determine the shrinkage or stretch of the substrate in the first printing station, measuring means such as a camera may be used. To help with the measuring, additional printing marks, cut marks or a calibration strip, may be added in the printed first image. In other embodiments which do not require the printing of additional marks, encoders may be used to measure an angular positon of a rotating member over which the substrate passes, downstream and upstream of the first printing station. By measuring the angular position of a rotating member over which the substrate passes, the speed of the substrate can be derived. A difference in speed of the substrate upstream and downstream of the first printing station is a measure for the shrinkage or stretch of the substrate. However, in yet other embodiments the shrinkage or stretch may be known, and a user may simply enter a value representative for the desired resolution in the printing direction.

In an exemplary embodiment, the firing frequency f' of each nozzle is set such that f'=k*v'/d'. In practice it is generally preferred to keep the printing speed v'=v constant, and to change the firing frequency f' as other components of the printing station or station will be implemented or optimised for a constant printing speed v=v'.

In an exemplary embodiment, the nozzle rows are directed perpendicular on the printing direction, and the nozzles of each nozzle row are fired substantially simultaneously while the firing of nozzles of adjacent nozzle rows are delayed or advanced with respect to each other. In that manner the number of different firing instants can be limited to the number of rows. Preferably, a fire timing difference between adjacent nozzle rows is ((d−d')/v'+/−(10% of 1/f')), more preferably ((d−d')/v'+/−(5% of 1/f')). It is noted that the timing does not need to be perfect in the sense that slight deviations will not be visible by the human eye in the printed image.

In an exemplary embodiment, the method comprises:
  setting a desired printing resolution (d'/k) in the printing direction, wherein k is an integer;
  setting the firing frequency f' of the nozzles and/or the printing speed v' such that f'=k*v'/d';
  setting a first fire instant t1 of a first nozzle row, wherein the first nozzle row is the first nozzle row when looking to the inkjet head in a direction opposite to the printing direction; and,
  when d'<d, setting an advanced fire instant t1', t1" for each subsequent nozzle row, wherein the advance of a subsequent nozzle row with respect to the previous nozzle row is (d−d')/v'+/−10% of 1/f', more preferably (d−d')/v'+/−5% of 1/f;
  when d'>d, setting a delayed fire instant t1', t1" for each subsequent nozzle row, wherein the delay of a subsequent nozzle row with respect to the previous nozzle row is (d'−d)/v'+/−10% of 1/f', more preferably (d'−d)/v'+/−5% of 1/f'.

In an exemplary embodiment, the nozzle rows are directed under an angle between 60° and 89° with respect to the printing direction; wherein a distance between adjacent nozzles of a nozzle row, projected on the printing direction, is b2. In addition to the firing of the rows at different instants in time, the plurality of nozzles within a nozzle row may then be fired at different instants in time, such that the distance b2' between printed adjacent dots or adjacent groups of dots of the same row, seen in the printing direction, is larger or smaller than b2. Also for such more complex heads, the method of the invention allows to print with a modified resolution.

In an exemplary embodiment using such an inkjet head, the method may further comprise:
  setting a first fire instant t11 of a first nozzle or first group of nozzles of a first nozzle row, wherein the first nozzle row is the first nozzle row when looking to the inkjet head in a direction opposite to the printing direction; and,
  when b2'<b2, setting an advanced fire instant t12 for a subsequent nozzle or group of nozzles of the first nozzle row;
  when b2'>b2, setting a delayed fire instant t12 f for a subsequent nozzle or group of nozzles of the first nozzle row; and,
  when b2'<b2, setting an advanced fire instant t11' for a nozzle or group of nozzles of a subsequent row, wherein the advance of the nozzle or nozzle group of the subsequent nozzle row with respect to the nozzle or nozzle group of the previous nozzle row is (d−d')/v'+/−10% of 1/f', more preferably (d−d')/v'+/−5% of 1/f;
  when b2'>b2, setting a delayed fire instant t11' for a nozzle or group of nozzles of a subsequent row, wherein the delay of the nozzle or nozzle group of the subsequent nozzle row with respect to the nozzle or nozzle group of the previous nozzle row is (d'−d)/v'+/−10% of 1/f', more preferably (d−d')/v'+/−5% of 1/f'.

Note that because of the small "theoretically required" differences in fire instant between adjacent nozzles of the same row, it is possible to work with groups of nozzles. For example, within a nozzle row, five adjacent groups of nozzles may be defined, and the nozzles within the same group may be fired at the same time, see also the example of FIG. 5 which is described in detail below.

For typical applications of the invention the change in resolution in the printing direction does not need to be very big. Suitable values for d' may be in the following range: 0.75*d<d'<1.25*d, more preferably 0.90*d<d'<1.10*d.

According to an exemplary embodiment, the plurality of nozzle rows comprises a first, a second and a third nozzle row, and the distance d12 (indicated with d in the previous embodiments, but indicated here with d12) between the first and the second nozzle row is different from a distance d23 between the second and the third nozzle row. The method comprises firing the plurality of nozzle rows at different instants in time, such that the distance d12' between printed rows of dots printed by said first and second nozzle rows and the distance d23' between printed rows of dots printed by said second and third nozzle rows, seen in the printing direction, is larger or smaller than d12 and d23, respectively. In that regard it is noted that in practice it may frequently happen that a distance between adjacent nozzle rows is different. For example, for a case with four rows (n=4), the following may apply: d12=k12*r and d23=k23*r, wherein r is the resolution, and wherein k12 may be 13 and k23 may be 266. For completeness it is noted that the number of scanlines between the first and the second row has been indicated in the previous embodiments with k, but is indicated here with k12, to indicate that it may be different from the number of scanlines k23 between the second and the third row.

According to another aspect of the invention there is provided a printing system comprising:

an inkjet head comprising a plurality n of parallel nozzle rows, wherein n is at least 2;

wherein each nozzle row comprises a plurality of nozzles, wherein adjacent nozzle rows of the plurality of nozzle rows are shifted with respect to each other, such that projected on a line perpendicular on a printing direction, the plurality of nozzles form a regular pattern; wherein a distance between two nozzle rows, seen in the printing direction, is d;

moving means configured for moving the substrate with respect to the inkjet head in the printing direction at a printing speed v';

a controller configured for controlling the firing of each nozzle of said plurality of nozzles with a firing frequency f'; so that said plurality of nozzle rows are fired at different instants in time, such that the distance d' between printed rows of dots printed by said two nozzle rows, seen in the printing direction, is larger or smaller than d; and configured for firing each nozzle with a firing frequency f', wherein the firing frequency f' and/or the printing speed v' are controlled such that f'=k*v'/d'.

Preferred embodiments of the printing system are disclosed in the dependent claims, and the technical advantages explained for the method claims apply mutatis mutandis for the system claims.

According to another aspect there is provided a digital data storage medium encoding a machine-executable program of instructions to perform one or more steps of a method according to any one of the previous embodiments, when the program is run on a computer. According to a further aspect of the invention, there is provided a computer program comprising computer-executable instructions to perform one or more steps of a method according to any one of the previous embodiments, when the program is run on a computer. According to a further aspect of the invention, there is provided a computer device or other hardware device programmed to perform one or more steps of any one of the embodiments of the method disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 4 illustrates schematically an exemplary embodiment of a fusion printing system;

DESCRIPTION OF EMBODIMENTS

Figure 1:
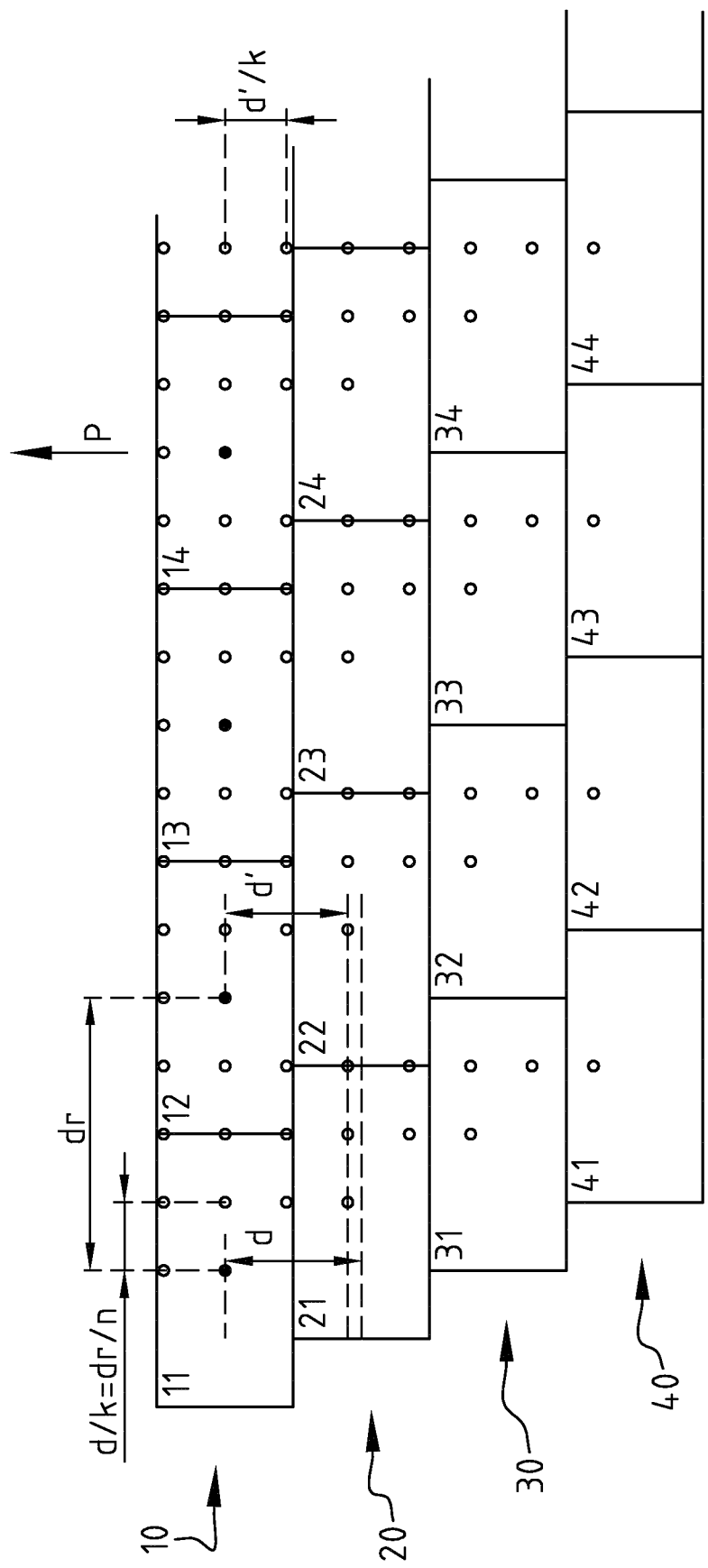
FIG. 1 illustrates schematically an inkjet head for use in an exemplary embodiment of the invention.

FIG. 1 shows an example of a known inkjet head comprising a plurality of rows 10, 20, 30, 40 here four rows (n=4). Each row 10, 20, 30, 40 has a plurality of nozzles 11, 12, 13, etc.; 21, 22, 23, etc.; 31, 32, 33, etc.; 41, 42, 43, etc. Each row comprises m nozzles, e.g. 320 nozzles (m=320). The rows 10, 20, 30, 40 are oriented in a direction perpendicular to the printing direction P, i.e. in the direction in which the substrate moves below the inkjet head. The distance between the centres of two adjacent nozzles of a same row is dr.

The number n of nozzle rows 10, 20, 30, 40 are parallel and adjacent nozzle rows of the plurality of nozzle rows are shifted with respect to each other in a direction perpendicular on the printing direction P. In the illustrated embodiment row 20 is shifted over a distance dr/n, i.e. dr/4 to the right with respect to row 10, row 30 is shifted over a distance dr/n, i.e. dr/4 to the right with respect to row 20, and row 40 is shifted over a distance dr/n, i.e. dr/4 to the right with respect to row 30. In other non-illustrated embodiments the shifting may be different, e.g. row 20 is shifted over a distance 2*dr/4 with respect to row 10, row 30 over a distance dr/4 with respect to row 10, and row 40 is shifted over a distance 3*dr/4 to the right with respect to row 30. The person skilled in the art understands that other variants are possible. Projected on a line perpendicular on the printing direction P, the centres of the nozzles are positioned at an equal distance of each other which corresponds to dr/n.

Figure 3A:
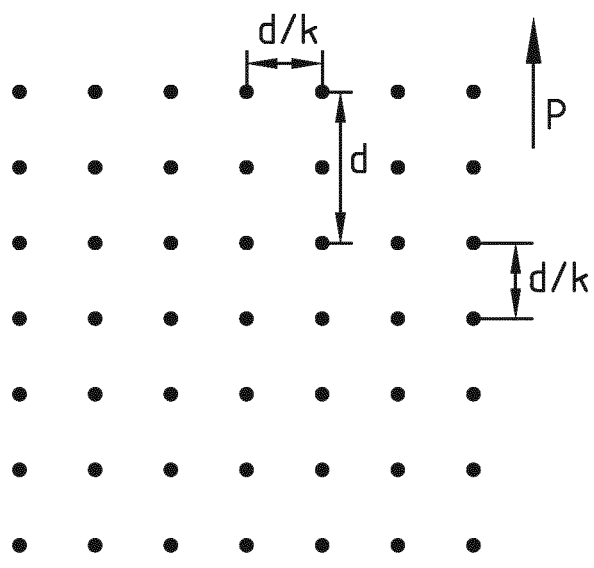
FIGS. 3A and 3B illustrate schematically a view of a printed pattern, without resolution correction and with resolution correction, respectively, for the inkjet head of FIG. 1.

A distance between adjacent nozzle rows, seen in the printing direction P, is d. This distance d is typically a multiple of dr/n, or d=k*dr/n where k is an integer. In the example of FIG. 1 k=2 for reasons of simplicity, but in practice k will be much bigger, preferably more than 10, e.g. 100 or more. In the known printing process, the substrate is moved with a printing speed v and all m×n nozzles are fired substantially simultaneously with a firing frequency f=k*v/d. It is noted that there may be a small difference (order of nanoseconds) to avoid large power peaks, but such small differences will not be visible in the printed image. In other words, the firing frequency is such that each time the substrate has moved over a distance d/k, a firing of all nozzles of the inkjet head is performed. The rows are shifted with respect to each other such that the combination of dots printed during subsequent steps of the printing process form a regular pattern, as illustrated in FIG. 3A. More in particular, when the inkjet head has fired all (n×m) nozzles a number of times corresponding to k times the number of rows (n*k), while the substrate moves below the ink-jet head, one line of the n lines extending perpendicular on the printing direction will be finished, and may comprise (n×m) dots.

Figure 2A:
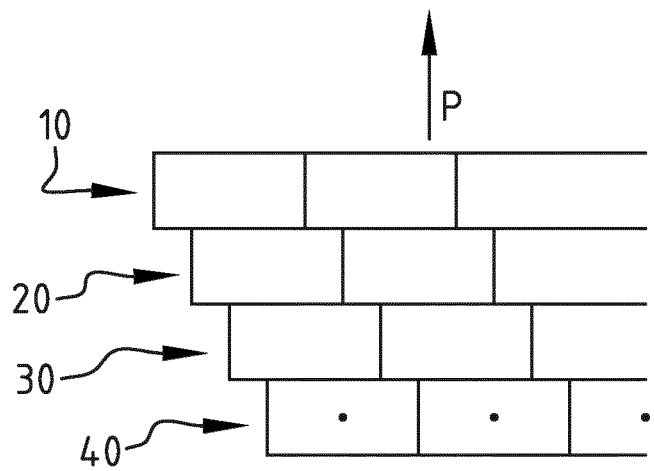
FIGS. 2A-2N illustrate schematically an exemplary embodiment of a method for inkjet printing with a variable resolution.
Figure 2B:
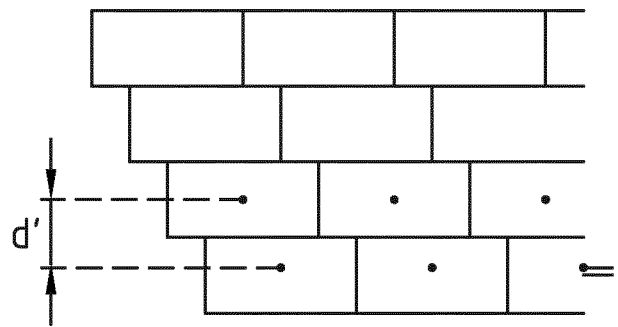
Figure 2C:
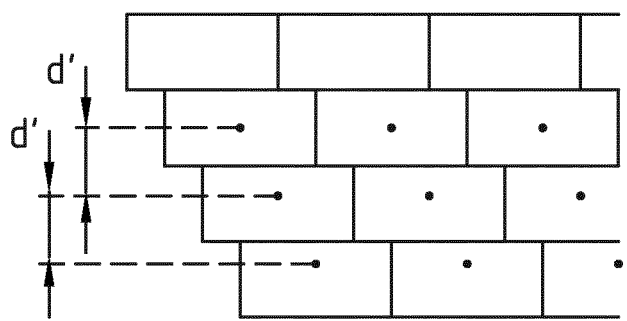
Figure 2D:
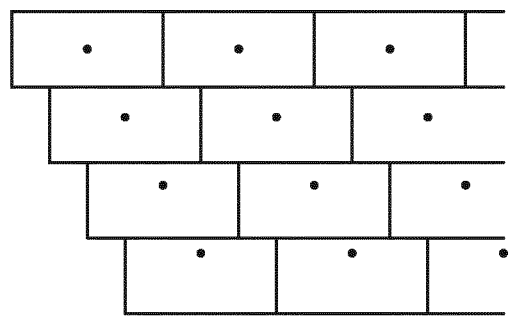

Now an exemplary embodiment of a printing process of the invention will be explained with reference to FIGS. 2A-2N. The printing process comprises a plurality of printing sequences, and each printing sequence comprises firing the plurality of nozzles of said plurality of nozzle rows 10, 20, 30, 40 at different instants in time. In the example of FIGS. 2A-2N it is assumed that four rows 10, 20, 30, 40 are present. During the subsequent printing processes the substrate moves below the inkjet head at a speed v'. Each nozzle is fired with a firing frequency f', and the firing frequency and/or the printing speed are chosen such that f'=k*v'/d', wherein k is an integer. Typically v' is fixed and f' can be set at a suitable value. In the illustrated example k is 2 for reasons of simplicity but in practice k may be bigger than 2, preferably higher than 10, and possibly even higher than 100. Exemplary values are:

v'=1 m/s;
d/k=42 micron
d'/k=40 micron
k=2
f'=25 kHz

It is noted that in practice d is preferably between 500 micron and 10 mm, and k is higher than 2 (see above), resulting in a d/k value which is e.g. between 10 and 500 micron. FIGS. 2A-2N illustrate a situation for which (n−1)*Δt<1/f'. Indeed, 3*(d−d')/v'<40 microseconds.

FIGS. 2A-2D illustrate a first printing sequence. This first printing sequence comprises:

Firing the nozzles of the fourth nozzle row 40 at an instant t1'''', see FIG. 2A;
Firing the nozzles of the third nozzle row 30 at an instant t1'', see FIG. 2B;
Firing the nozzles of the second nozzle row 20 at an instant t1', see FIG. 2C;
Firing the nozzles of the first nozzle row 10 at an instant t1, see FIG. 2D.

The timing of the firing of the respective rows is chosen such that t1'''<t1''<t1'<t1. More in particular the timing of the firing is preferably such that:

$$t1'''=t1-3*\Delta t$$

$$t1''=t1-2*\Delta t$$

$$t1'=t1-\Delta t$$

wherein Δt=(d−d')/v'+/−10% of 1/f', more preferably (d−d')/v'+/−5% of 1/f'.

In other words, instead of firing all rows at the same instant, the fourth nozzle row is fired first, then the third nozzle row, then the second nozzle row and finally the first nozzle row. The delay between the firing is such that, seen in the printing direction the desired increased resolution (d'/k<d/k) is obtained. By using such a timing the distance between the subsequently printed rows of dots is d', see FIGS. 2B and 2C.

Figure 2E:
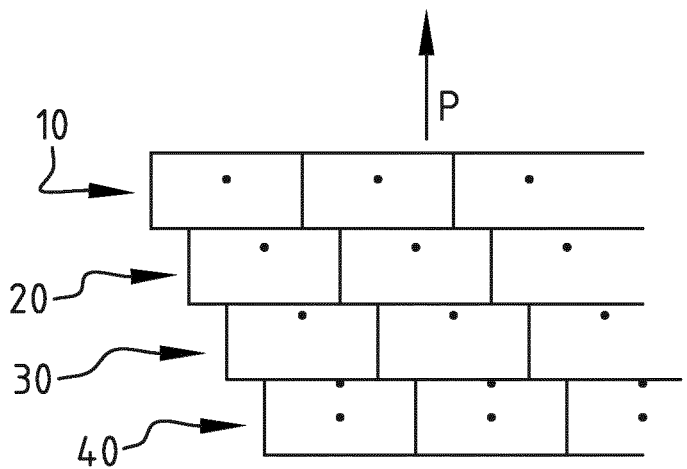
Figure 2F:
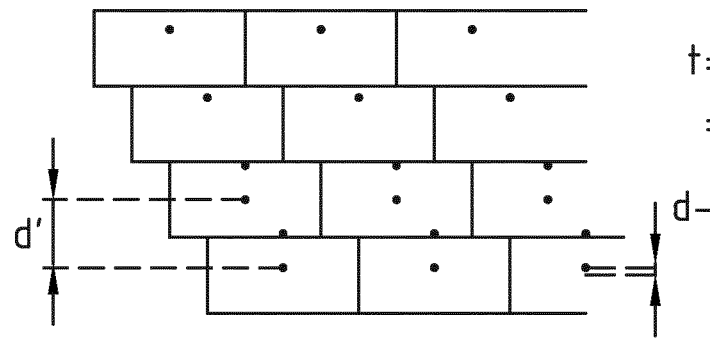
Figure 2G:
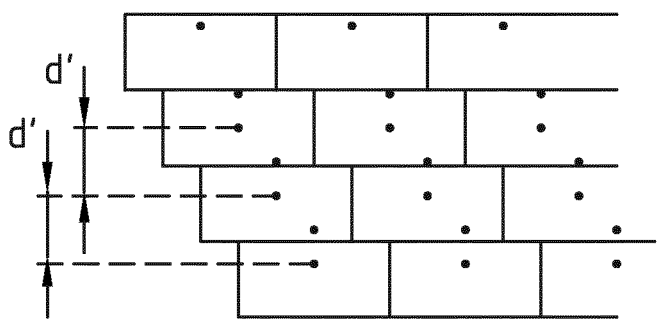
Figure 2H:
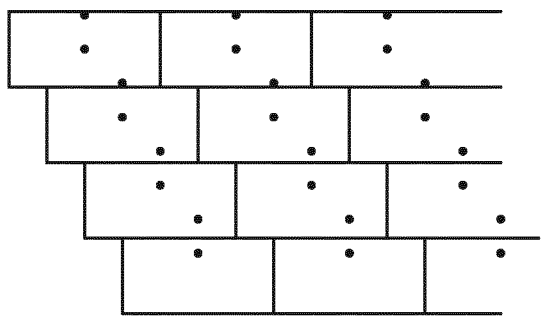
Figure 2I:
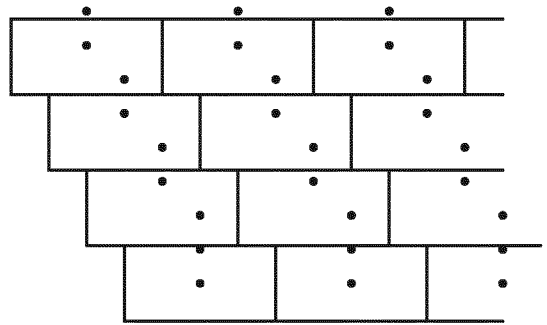
Figure 2J:
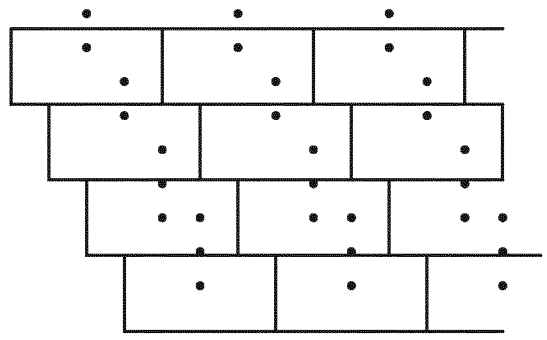
Figure 2K:
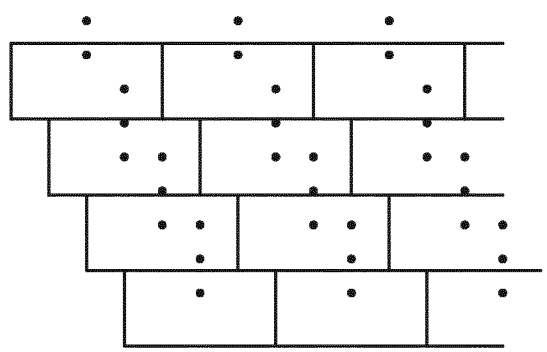
Figure 2L:
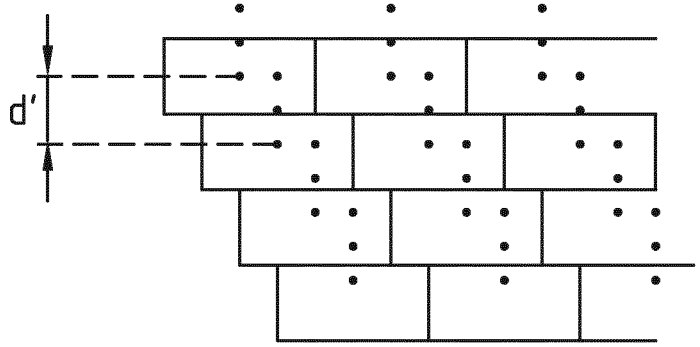

FIGS. 2E-2H illustrate a second printing sequence. This second printing sequence comprises:

Firing the nozzles of the fourth nozzle row 40 at an instant t1'''+1/f', see FIG. 2E; at this instant the dots that are being printed by the fourth nozzle row 40 will be aligned with the dots printed at t1''' by the fourth nozzle row 40 during the first sequence;
Firing the nozzles of the third nozzle row 30 at an instant t1''+1/f', see FIG. 2F; at this instant the dots that are being printed by the third nozzle row 30 will be aligned with the dots printed at t1'' by the third nozzle row 30 during the first sequence;
Firing the nozzles of the second nozzle row 20 at an instant t1'+1/f', see FIG. 2G;
Firing the nozzles of the first nozzle row 10 at an instant t1+1/f', see FIG. 2H.

The timing of the firing of the respective rows is chosen such that, like in the first sequence, the fourth nozzle row is fired first, then the third nozzle row, then the second nozzle row and finally the first nozzle row. The delay between the firing is such that, seen in the printing direction the desired increased resolution (d'/k<d/k) is obtained.

Figure 2M:
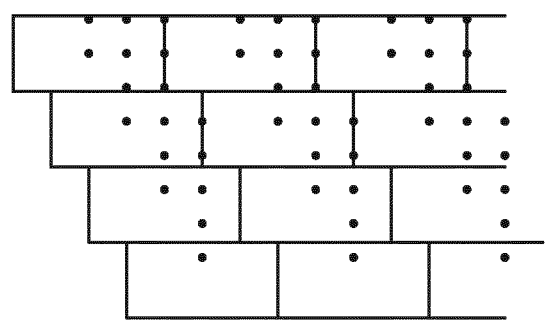
Figure 2N:
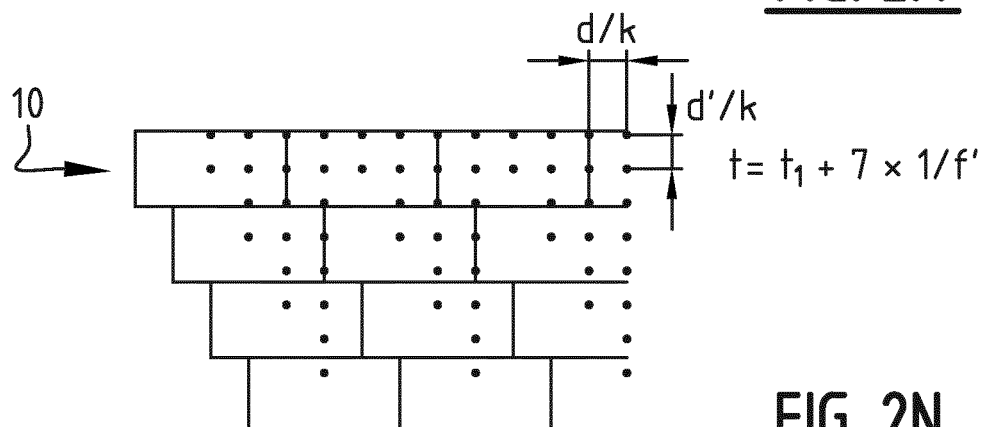

FIGS. 2I-2L illustrate the printed dots at consecutive instants t1'''+2*1/f', t1''+2*1/f', t1'+2*1/f', t1+2*1/f' during a third sequence, in a manner similar to the explanation given above for the second sequence. FIG. 2M illustrates the printed dots at an instant t1+4*1/f' at the end of a fifth sequence, and FIG. 2N illustrates the printed dots at an instant t1+7*1/f' at the end of a eight sequence. As can be seen, after eight sequences two (k=2) full rows of printed dots d1, d2, etc. are completed. The number of sequences needed to print a full row of dots corresponds with (n−1)*k+1, here 7.

Figure 3B:
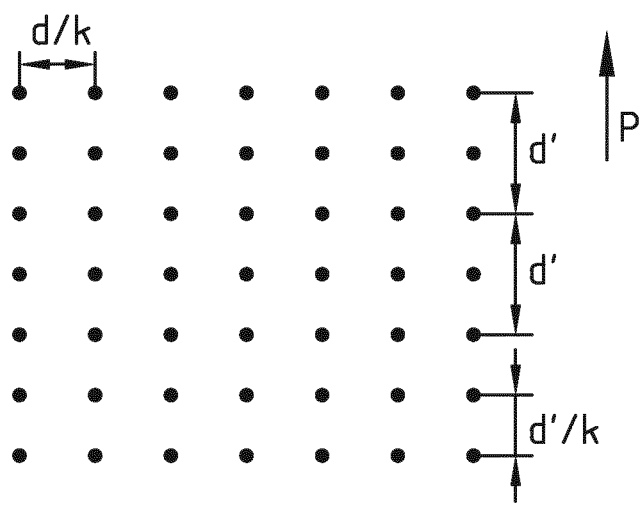

Using such a printing process a dot pattern is obtained as shown in FIG. 3B, wherein the distance between adjacent dots, seen in the printing direction P is d'/k. The distance between adjacent dots, seen in a direction perpendicular to the printing direction remains unchanged and is equal to d/k.

FIGS. 2A-2N illustrate an exemplary embodiment where the resolution is increased by adjusting the timing of the firing of the rows of the inkjet head. The skilled person understands that in a similar manner the resolution may be decreased (i.e. d'/k>d/k) by firing within a printing sequence first the first nozzle row, then the second nozzle row, then the third nozzle row and finally the fourth nozzle row. For example, for the first sequence, the printing sequence will comprise:

Firing the nozzles of the first nozzle row 10 at an instant t1;
Firing the nozzles of the second nozzle row 20 at an instant t1';
Firing the nozzles of the third nozzle row 30 at an instant t1'';
Firing the nozzles of the fourth nozzle row 40 at an instant t1''';
and the timing will be:

$$t1'=t1+\Delta t$$

$$t1''=t1+2*\Delta t$$

$$t1'''=t1+3*\Delta t$$

wherein Δt=(d'−d)/v'+/−10% of 1/f', more preferably (d'−d)/v'+/−5% of 1/f'.

In preferred embodiments of the invention the method of the invention may be used to increase or decrease the resolution in the printing direction slightly. Preferably, 0.75*d<d'<1.25*d, more preferably 0.90*d<d'<1.10*d. Such variations of the resolution will typically be sufficient to compensate for e.g. a shrinking or extension of the substrate before and/or after the printing.

It is noted that in practice f' could be e.g. 100 kHz. This would imply that 1/f'=10 microseconds. In that case (n−1)*Δt>1/f'. Indeed, 3*(d−d')/v'>10 microseconds. Thus, the order of the steps illustrated in FIGS. 2A-2N will be different in such a case. The step of figure E would then happen before the step of FIG. 2D, etc. In other words, depending on the value of f', v', d and d', the order of the steps may be different.

FIG. 4 illustrates a fusion printing system in which an exemplary embodiment of the method of the invention is used. A first image is printed on the substrate in a first printing station 410 upstream of a second printing station comprising an inkjet head, e.g. an embodiment of an ink-jet head as described above. The second printing station 420 with the inkjet head prints a second image on said first image. If the substrate has undergone a shrinkage or extension in the printing direction P when leaving the first printing station 410, the resolution of the second printing station 410 may be adjusted in the printing direction P. As explained above, during each printing sequence the plurality of nozzles of said plurality of nozzle rows may be fired at different instants in time, such that d'/k is smaller than d/k in case of shrinkage and larger than d/k in case of extension. This can be achieved using a controller 430 which controls the timing of the firing. The shrinkage or extension may be known to the operator, and may be input to the controller 430 using an input interface 450. In other embodiments the shrinkage or extension may be measured using sensing means 444, and a measure sensed by the sensing means may be input to the controller 430.

The first printing station may be configured for xerography printing using dry or liquid toner. An exemplary digital printing system using dry toner is described in U.S. Pat. No. 6,174,047 in the name of the applicant, which is included herein by reference.

An exemplary digital printing system using liquid toner is described in more detail in US patent application with publication no. 2009/0052948, the content of which is incorporated in its entirety by reference. Typically, the toner liquid may have a solid concentration between 5% and 60 wt %. The high-shear viscosity, as measured at a shear rate of 3000 s−1 at 25° C. with a cone plate geometry of C60/1° and a gap of 52 μm, is preferably in the range of 5-500 mPa·s. A further developed exemplary digital printing system using liquid toner is described in detail in EP 17 158 379, the content of which is incorporated in its entirety by reference. The described printing system comprises a control mechanism configured for adjusting a pattern sustained on an imaging member, in order to compensate for the increased width (i.e. perpendicular on the printing direction) of the substrate downstream of an image forming unit. Such a control mechanism may be configured to add pixels to the pattern sustained on the imaging member to compensate for the increased width of the substrate S downstream of said image forming unit. However, the described apparatus does not compensate for shrinkage or extension in the printing direction.

Particular embodiments of the invention relate to the field of digital printing apparatus and methods for so-called "continuous" webs, i.e. printing systems where a continuous roll of substrate (e.g., paper, plastic foil, or a multi-layer combination thereof) is run through the printing stations at a constant speed, in particular to print large numbers of copies of the same image(s), or alternatively, series of images, or even large sets of individually varying images.

Figure 5:
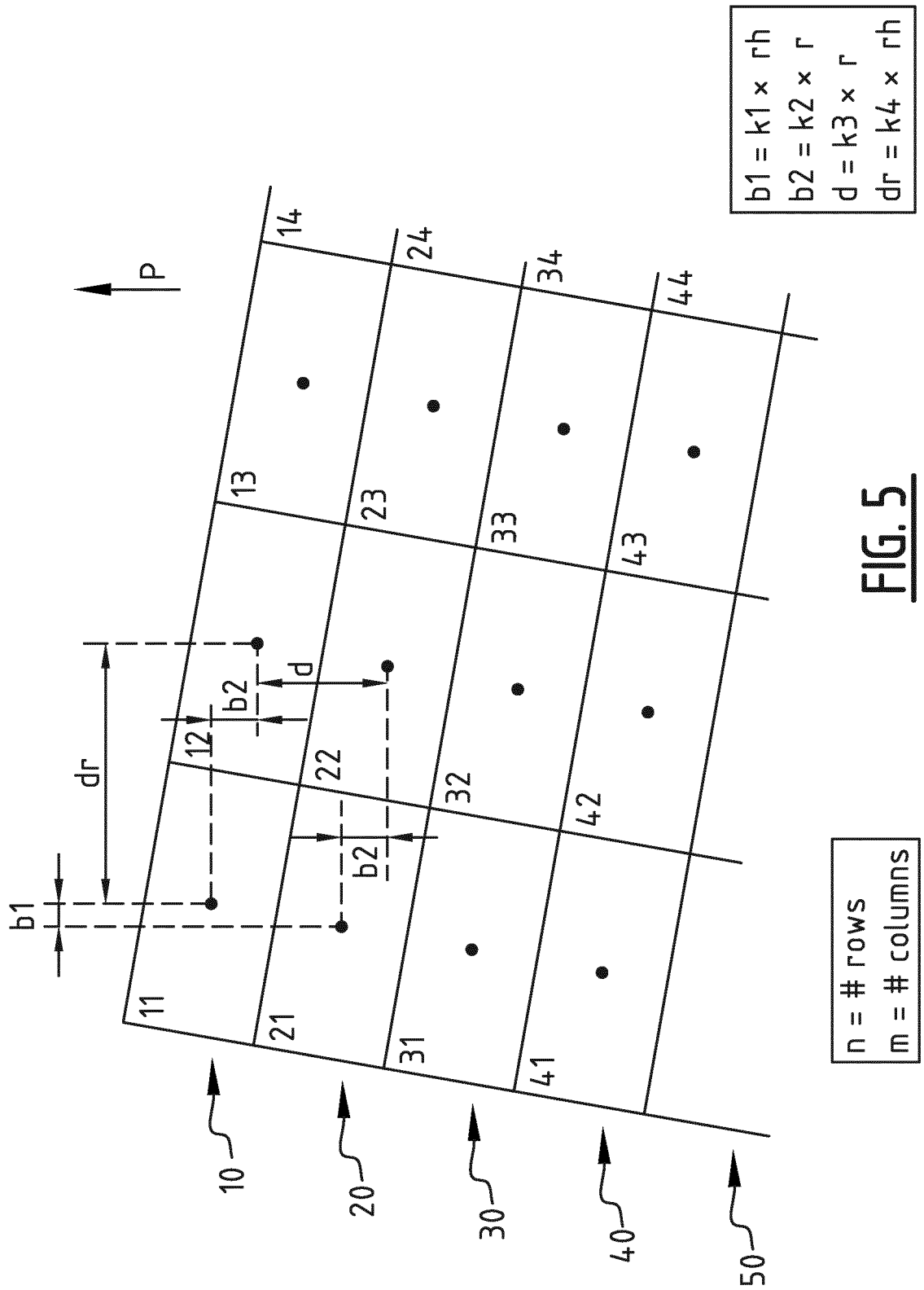
FIG. 5 illustrates schematically an inkjet head for use in another exemplary embodiment of the invention.

FIG. 5 shows an example of another known inkjet head comprising a plurality of rows 10, 20, 30, 40, 50, etc. e.g. 32 rows (n=32). Each row 10, 20, 30, 40, 50 etc. comprises a plurality of nozzles 11, 12, 13, 14 etc.; 21, 22, 23, 24, etc.; 31, 32, 33, 34, etc.; 41, 42, 43, 44, etc. Each row comprises m nozzles, e.g. 64 nozzles (m=64). The nozzle rows 10, 20, 30, 40, 50, etc. are parallel and are directed under an angle between 60° and 89° with respect to the printing direction. The distance between the centres of two adjacent nozzles of a same row, when projected on a line perpendicular on the printing direction P is dr. dr is a multiple of the desired resolution rh seen in a horizontal direction perpendicular on the print direction (dr=k4*rh, wherein k4 is an integer).

Adjacent nozzle rows of the plurality of nozzle rows are shifted with respect to each other in a direction perpendicular on the printing direction P over a distance b1. In the illustrated embodiment row 20 is shifted over a distance b1 to the left with respect to row 10, row 30 is shifted over a distance b1 to the left with respect to row 20, etc. The person skilled in the art understands that other variants are possible, similar to what has been explained above for FIG. 1. Projected on a line perpendicular on the printing direction P, the centres of the nozzles are positioned at an equal distance of each other which corresponds to b1. The distance between the centres of adjacent nozzles of a same row, projected on the printing direction, is b2. b1 is a multiple of the resolution rh in a direction perpendicular on the printing direction, i.e. b1=k1*rh, wherein k1 is an integer. b2 is a multiple of the resolution r in the printing direction, i.e. b2=k2*r, wherein k2 is an integer.

Figure 6A:
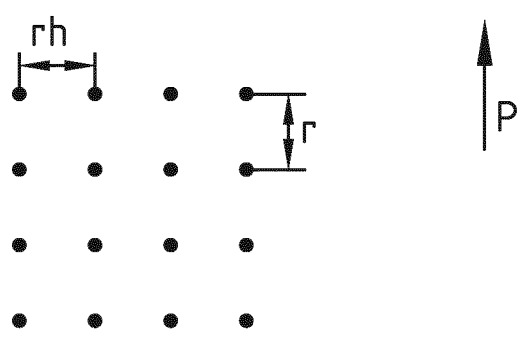
FIGS. 6A and 6B illustrate schematically a view of a printed pattern, without resolution correction and with resolution correction, respectively, for the inkjet head of FIG. 5.
Figure 6B:
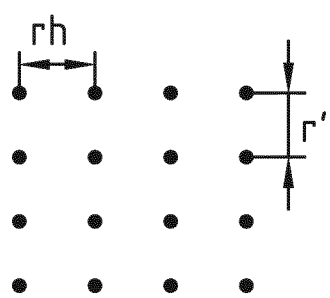

A distance between adjacent nozzle rows, seen in the printing direction P, is d. Also d is a multiple of the desired resolution r seen in the printing direction (d=k3*r, wherein k3 is an integer). In the known printing process, the substrate is moved with a printing speed v and all m×n nozzles are fired substantially simultaneously with a firing frequency f=k*v/d, wherein k is an integer. In other words, the firing frequency is such that each time the substrate has moved over a distance d/k a firing of all nozzles of the inkjet head is performed. The rows are shifted with respect to each other such that the combination of dots printed during subsequent steps of the printing process form a regular pattern, as illustrated in FIG. 6A. More in particular, when the inkjet head has fired all (n×m) nozzles a number of times corresponding to n*k−1, while the substrate moves below the inkjet head, one line of the n lines extending perpendicular on the printing direction will be finished, and may comprise (n×m) dots at a resolution r, seen in the printing direction and rh seen in a direction perpendicular on the printing direction, of each other.

In an exemplary embodiment of the invention, using the inkjet head of FIG. 5, the printing process may comprise a plurality of printing sequences, and each printing sequence comprises firing the plurality of nozzles of said plurality of nozzle rows 10, 20, 30, 40, 50, etc. at different instants in time. During the subsequent printing processes the substrate moves below the ink-jet head at a speed v'. Each nozzle is fired with a firing frequency f', such that f'=k*v/d', wherein k is an integer. Typically f' may be adjusted in function of the desired resolution r' in the printing direction (determined by d' and b2'; d' and b2' being a multiple of the desired resolution r' in the printing direction), while v'=v is kept constant.

This first printing sequence comprises:
Firing nozzle 11 at an instant t11;
Firing nozzle 21 at an instant t11'=t11−Δt;
Firing nozzle 31 at an instant t11"=t11−2*Δt;
Firing nozzle 41 at an instant t11'''=t11−3*Δt;
Etc.
Firing nozzle 12 at an instant t12=t11−Δt';
Firing nozzle 22 at an instant t12'=t12−Δt;
Firing nozzle 32 at an instant t12"=t12−2*Δt;

Firing nozzle 42 at an instant t12'''=t12−3*Δt;
Etc.
Firing nozzle 13 at an instant t13=t11−2*Δt';
Firing nozzle 23 at an instant t13'=t13−Δt;
Firing nozzle 33 at an instant t13''=t13−2*Δt;
Firing nozzle 43 at an instant t13'''=t32−3*Δt;
Etc.
wherein Δt=(d−d')/v'+/−10% of 1/f', more preferably (d−d')/v'+/−5% of 1/f' and
Δt'=(b2−b2')/v'+/−10% of 1/f', more preferably (b2−b2")/v'+/−5% of 1/f'.

Depending on the number of rows and columns of nozzles and on the desired resolution r' various printing sequences may be determined allowing to obtain the desired resolution r' in the printing direction. More in particular, the resolution r' may be adjusted by adjusting the firing of the nozzles appropriately. Further it is noted that, as explained in connection with FIGS. 2A-2N, depending on the value of f', v', d and d', the order of the steps of the printing sequence may be different.

Since Δt'=(b2−b2')/v' will be very small, it may be decided to group the firing of certain nozzles. E.g. it could be considered to fire nozzles 11, 12, 13, 14 and 15 at the same instant, e.g. an average of t11, t12, t13, t14 and t15 as calculated above, e.g. at (t11−2*Δt'). Similarly it may be decided to group nozzles 16, 17, 18, 19 and 20 to fire at the same instant, e.g. an average of t16, t17, t18, t19 and t20 as calculated above, e.g. at (t11−7*Δt'). The same may be done for the other nozzles of the first nozzle row. Further, also for the second and following rows, a similar grouping may be done. In that manner the number of firing instants within one printing sequence may be lower than n*m, preferably lower than n*m/5, more preferably lower than 10.

By choosing an appropriate timing of the firing of the nozzles, the distance r' between printed adjacent dots of the same row, i.e. the resolution seen in the printing direction, can be made to be larger or smaller than r.

A person of skill in the art would readily recognize that steps of various above described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "controllers", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Whilst the principles of the invention have been set out above in connection with specific embodiments, it is to be understood that this description is merely made by way of example and not as a limitation of the scope of protection which is determined by the appended claims.

The invention claimed is:

1. A method for printing with an inkjet head; said method comprising:
   printing with an inkjet head comprising a plurality n of parallel nozzle rows, wherein n is at least 2; wherein each nozzle row comprises a plurality of nozzles, and wherein adjacent nozzle rows of the plurality of nozzle rows are shifted with respect to each other, such that projected on a line perpendicular on a printing direction, the plurality of nozzles form a regular pattern; wherein a distance between two nozzle rows, seen in the printing direction, is d;
   wherein said printing comprises:
   moving the substrate with respect to the inkjet head in the printing direction at a printing speed v';
   firing each nozzle of said plurality of nozzles with a firing frequency f';
   wherein said plurality of nozzle rows are fired at different instants in time, such that the distance d' between printed rows of dots printed by said two nozzle rows, seen in the printing direction, is larger or smaller than d;
   wherein each nozzle is fired with a firing frequency f', wherein the firing frequency f' and/or the printing speed v' are chosen such that f'=k*v'/d'; and
   wherein k is an integer.

2. The method of claim 1, further comprising printing a first image on the substrate at a first printing station upstream of the inkjet head, wherein the substrate has undergone a shrinkage or extension in the printing direction when leaving said first printing station; and wherein a second image is printed on said first image using the inkjet head, wherein the plurality of nozzle rows are fired at different instants in time, such that d' is smaller than d in case of shrinkage and larger than d in case of extension.

3. The method of claim 2, wherein the firing frequency f' of each nozzle is set such that f'=v'/d'.

4. The method of claim 1 wherein the nozzle rows are directed perpendicular on the printing direction, and wherein the nozzles of each nozzle row are fired substantially simultaneously while the firing of nozzles of the nozzle rows are delayed or advanced with respect to each other.

5. The method of claim 4, wherein a fire timing difference between the nozzle rows is ((d−d')/v'+/−(10% of 1/f')).

6. The method of claim 1, comprising:
   setting a desired printing resolution (d'/k) in the printing direction, wherein k is an integer;
   setting the firing frequency f' of the nozzles and/or the printing speed v' such that f'=k*v'/d';
   setting a first fire instant t1 of a first nozzle row, wherein the first nozzle row is the first nozzle row when looking to the inkjet head in a direction opposite to the printing direction; and,
   i. when d'<d, setting an advanced fire instant t1', t1" for each subsequent nozzle row, wherein the advance of a subsequent nozzle row with respect to the previous nozzle row is (d−d')/v'+/−10% of 1/f';
   ii. when d'>d, setting a delayed fire instant t1', t1" for each subsequent nozzle row, wherein the delay of a subsequent nozzle row with respect to the previous nozzle row is (d'−d)/v'+/−10% of 1/f'.

7. The method of claim 1, wherein the nozzle rows are directed under an angle between 60° and 89° with respect to the printing direction; wherein a distance between adjacent nozzles of a nozzle row, projected on the printing direction, is b2; wherein the plurality of nozzles within a nozzle row are fired at different instants in time, such that the distance b2' between printed adjacent dots or adjacent groups of dots of the same row, seen in the printing direction, is larger or smaller than b2.

8. The method of claim 7 comprising:
setting a first fire instant t11 of a first nozzle or group of nozzles of a first nozzle row, wherein the first nozzle row is the first nozzle row when looking to the inkjet head in a direction opposite to the printing direction; and,
  i. when b2'<b2, setting an advanced fire instant t12 for a subsequent nozzle or group of nozzles of the first nozzle row;
  ii. when b2'>b2, setting a delayed fire instant t12 for a subsequent nozzle or group of nozzles of the first nozzle row; and,
  i. when b2'<b2, setting an advanced fire instant t11' for a nozzle or group of nozzles of a subsequent row, wherein preferably the advance of the nozzle or nozzle group of the subsequent nozzle row with respect to the nozzle or nozzle group of the previous nozzle row is (d−d')/v'+/−10% of 1/f';
  ii. when b2'>b2, setting a delayed fire instant t11' for a nozzle or group of nozzles of a subsequent row, wherein preferably the delay of the nozzle or nozzle group of the subsequent nozzle row with respect to the nozzle or nozzle group of the previous nozzle row is (d'−d)/v'+/−10% of 1/f'.

9. The method of claim 1 wherein 0.75*d<d'<1.25*d, more preferably 0.90*d<d'<1.10*d.

10. The method of claim 1, wherein the plurality of nozzle rows comprises at a first, a second and a third nozzle rows, and wherein a distance d12 between the first and the second nozzle row is different from a distance d23 between the second and the third nozzle row; wherein said plurality of nozzle rows are fired at different instants in time, such that the distance d12' between printed rows of dots printed by said first and second nozzle rows, seen in the printing direction, is larger or smaller than d12, and such that the distance d23' between printed rows of dots printed by said second and third nozzle rows, seen in the printing direction, is larger or smaller than d23.

11. The system of claim 1 comprising:
a first printing station configured for printing a first image on the substrate, wherein first printing station causes a shrinkage or extension of the substrate in the printing direction; and
a second printing station comprising the inkjet head, said second printing station being configured to print a second image on said first image using the inkjet head, wherein the controller is configured so that the plurality of nozzle rows are fired at different instants in time, such that d' is smaller than d in case of shrinkage and larger than d in case of extension.

12. The system of claim 11, wherein the controller is configured to set the firing frequency f' of each nozzle such that f'=k*v'/d'.

13. A printing system comprising:
an inkjet head comprising a plurality n of parallel nozzle rows, wherein n is at least 2; wherein each nozzle row comprises a plurality of nozzles, wherein adjacent nozzle rows of the plurality of nozzle rows are shifted with respect to each other, such that projected on a line perpendicular on a printing direction, the plurality of nozzles form a regular pattern; wherein a distance between two nozzle rows, seen in the printing direction, is d;
moving means configured for moving the substrate with respect to the ink-jet head in the printing direction at a printing speed v';
a controller configured for controlling the firing of each nozzle of said plurality of nozzles with a firing frequency f; so that said plurality of nozzle rows are fired at different instants in time, such that the distance d' between printed rows of dots printed by said nozzle rows, seen in the printing direction, is larger or smaller than d;
the controller configured for firing each nozzle of said nozzle rows with a firing frequency f', and configured to control the firing frequency f' and/or the printing speed v' such that f'=k*v'/d'; wherein k is an integer.

14. The system of claim 13, wherein the nozzle rows are directed perpendicular on the printing direction, and wherein the controller is configured to fire the nozzles of each nozzle row substantially simultaneously while the firing of nozzles of the nozzle rows are delayed or advanced with respect to each other.

15. The system of claim 14 wherein a fire timing difference between adjacent nozzle rows is (d−d')/v'+/−10% of 1/f'.

16. The system of claim 13 wherein the controller is configured:
to set a desired printing resolution (d'/k) in the printing direction, wherein k is an integer;
to set the firing frequency f' of the nozzles and/or the printing speed v' such that f'=k*v'/d'; and
to set a first fire instant t1 of a first nozzle row, wherein the first nozzle row is the first nozzle row when looking to the inkjet head in a direction opposite to the printing direction; and,
  i. when d'<d, to set an advanced fire instant t1', t1" for each subsequent nozzle row, wherein the advance of a subsequent nozzle row with respect to the previous nozzle row is (d−d')/v'+/−10% of 1/f';
  ii. when d'>d, to set a delayed fire instant t1', t1" for each subsequent nozzle row, wherein the delay of a subsequent nozzle row with respect to the previous nozzle row is (d'−d)/v'+/−10% of 1/f'.

17. The system of claim 13, wherein the nozzle rows are directed under an angle between 60° and 89° with respect to the printing direction; wherein a distance between adjacent nozzles of a nozzle row, projected on the printing direction, is b2; wherein the controller is configured to fire the plurality of nozzles within a nozzle row at different instants in time, such that the distance b2' between printed adjacent dots or adjacent groups of dots of the same row, seen in the printing direction, is larger or smaller than b2.

18. The system of claim 17, wherein the controller is configured:
to set a first fire instant t11 of a first nozzle or group of nozzles of a first nozzle row, wherein the first nozzle row is the first nozzle row when looking to the inkjet head in a direction opposite to the printing direction; and,
  i. when b2'<b2, to set an advanced fire instant t12 for a subsequent nozzle or group of nozzles of the first nozzle row;

ii. when b2'>b2, to set a delayed fire instant t12 f for a subsequent nozzle or group of nozzles of the first nozzle row; and,
  i. when b2'<b2, to set an advanced fire instant t11' for a nozzle or group of nozzles of a subsequent row, wherein the advance of the nozzle or nozzle group of the subsequent nozzle row with respect to the nozzle or nozzle group of the previous nozzle row is $(d-d')/v' +/- 10\%$ of $1/f'$;
  ii. when b2'>b2, to set a delayed fire instant t11' for a nozzle or group of nozzles of a subsequent row, wherein the delay of the nozzle or nozzle group of the subsequent nozzle row with respect to the nozzle or nozzle group of the previous nozzle row is $(d'-d)/v' +/- 10\%$ of $1/f'$.

19. A method for printing with an inkjet head comprising:
printing with an inkjet head comprising a plurality n of parallel nozzle rows, wherein n is at least 2; wherein each nozzle row comprises a plurality of nozzles, wherein adjacent nozzle rows of the plurality of nozzle rows are shifted with respect to each other, such that projected on a line perpendicular on a printing direction (P), the plurality of nozzles form a regular pattern; wherein a distance between two nozzle rows, seen in the printing direction, is d;

wherein said printing comprises:
  moving the substrate with respect to the inkjet head in the printing direction at a printing speed v';
  firing each nozzle of said plurality of nozzles with a firing frequency f';
wherein said plurality of nozzle rows are fired at different instants in time, such that the distance d' between printed rows of dots printed by said two nozzle rows, seen in the printing direction, is larger or smaller than d;
further comprising printing a first image on the substrate at a first printing station upstream of the inkjet head, wherein the substrate has undergone a shrinkage or extension in the printing direction when leaving said first printing station; and wherein a second image is printed on said first image using the ink-jet head, wherein the plurality of nozzle rows are fired at different instants in time, such that d' is smaller than d in case of shrinkage and larger than d in case of extension.

20. The method of claim 19, wherein each nozzle is fired with a firing frequency f', wherein the firing frequency f' and/or the printing speed v' are chosen such that $f'=k*v'/d'$; wherein k is an integer.

* * * * *